(12) United States Patent
Whynot (10) Patent No.: US 9,239,767 B2
(45) Date of Patent: Jan. 19, 2016

(54) SELECTIVE DATABASE REPLICATION

(75) Inventor: Stephen Whynot, Mckinney, TX (US)

(73) Assignee: RPX Clearinghouse LLC, San Francisco, CA (US)

( * ) Notice: Subject to any disclaimer, the term of this patent is extended or adjusted under 35 U.S.C. 154(b) by 1865 days.

(21) Appl. No.: 12/341,845

(22) Filed: Dec. 22, 2008

(65) Prior Publication Data
US 2010/0161551 A1    Jun. 24, 2010

(51) Int. Cl.
G06F 17/30    (2006.01)
G06F 11/20    (2006.01)

(52) U.S. Cl.
CPC ........ *G06F 11/2094* (2013.01); *G06F 11/2097* (2013.01); *G06F 17/30265* (2013.01); *G06F 17/30578* (2013.01); *G06F 17/30581* (2013.01)

(58) Field of Classification Search
CPC .................. G06F 17/30581; G06F 17/30371; G06F 17/30368
USPC .......................................................... 707/610
See application file for complete search history.

(56) References Cited

U.S. PATENT DOCUMENTS

| | | | |
|---|---|---|---|
| 5,543,785 A | 8/1996 | Vatt et al. | |
| 6,374,262 B1 * | 4/2002 | Kodama | 707/623 |
| 6,732,122 B2 * | 5/2004 | Zoltan | 707/610 |
| 7,577,661 B2 | 8/2009 | Bankston et al. | |
| 2005/0198074 A1 | 9/2005 | Khayter et al. | |
| 2006/0173850 A1 * | 8/2006 | Auer et al. | 707/10 |
| 2006/0190497 A1 | 8/2006 | Inturi et al. | |
| 2006/0235904 A1 | 10/2006 | Kapur | |
| 2006/0253500 A1 * | 11/2006 | Kapur | 707/200 |
| 2008/0034014 A1 | 2/2008 | Beek et al. | |
| 2008/0183776 A1 | 7/2008 | Kulkarni et al. | |
| 2008/0189340 A1 | 8/2008 | Blea et al. | |

FOREIGN PATENT DOCUMENTS

| | | |
|---|---|---|
| JP | 200047918 A | 2/2000 |
| JP | 2001034518 A | 2/2001 |
| JP | 2004295540 A | 10/2004 |

OTHER PUBLICATIONS

International Search Report for PCT/IB2009/007873, mailed May 25, 2010.
Notification for Reasons for Rejection for Japanese Patent Application No. 2011-541637, mailed Oct. 15, 2013, 4 pages.
Office Action for Russian Patent Application No. 2011127316, mailed Nov. 13, 2013, 7 pages.
(Continued)

*Primary Examiner* — Michelle Owyang
(74) *Attorney, Agent, or Firm* — Withrow & Terranova, PLLC (57) ABSTRACT

A method and system for selectively replicating data from a primary database associated with a primary server to a secondary database associated with a secondary server. The secondary server determines that a replication task using a first update command has modified the primary database. The secondary server determines a primary table in the primary database has been updated. The secondary server generates a secondary federated table that is coupled to the primary table. The secondary server obtains a second update command based on the first update command from the primary database and applies the second update command to a secondary table in the secondary database using the secondary federated table.

1 Claim, 6 Drawing Sheets

(56) References Cited

OTHER PUBLICATIONS

Author Unknown, "12.7.2 How to Use Federated Tables," MySQL 5.0 Reference Manual, Dec. 11, 2007, 2 pages, http://dev.mysql.com/doc/refman/5.0/en/federated-use.html.

Author Unknown, "13.7 The Federated Storage Engine," MySQL 5.0 Reference Manual, Dec. 5, 2007, 1 page, http://dev.mysql.com/doc/refman/5.0/en/federated-storage-engine.htm.

Author Unknown, "19.1.2.1 Comparison of Statement-Based and Row-Based Replication," My SQL 5.1 Reference Manual, Sep. 10, 2008, 3 pages, https://web/archive/org/web/20080910235422/http://dev.mysql.com/doc/refman/5.1/en/replication-sbr-rbr.htrn.

Author Unknown, "Introduction to Replication and Event Publishing," IBM Information Integration, Version 9.5, Dec. 31, 2007, pp. 231-235, http://public.dhe.ibm.com/ps/products/db2/info/vr95/pdf/en_us/db2gpe951.pdf.

Author Unknown, "SQL Replication Guide and Reference," IBM Information Integration, Version 9.5, Dec. 31, 2007, 68 pages, http://pic.dhe.ibm.com/infoceter/iseries/v6rlm0/topic/books/sc191030.pdf Bonnet, Olivier et al., "My Mother Thinks I'm a DBA! Cross-Platform, Multi-Vendor, Distributed Relational Data Replication with IBM DB2 DataPropoagator and IBM DataJoiner Made Easy," International Technical Support Organization, Jul. 6, 1999, 34 pages, http://www.redbooks.ibm.com/redbooks/pdfs/sg245463.pdf.

Gray, Jim et al., "The Dangers of Replicon and a Solution," Proceedings of the 1996 ACMm SIGMOD International Conference on Management of Data. Jun. 1, 1996, 99. 173-182.

Haas, L.M. et al., "Data Integration Through Database Federation," IBM Systems Journal, vol. 41, No. 4, Jan. 1, 2002, pp. 578-596.

Salas, J. et al., "Lightweight Reflection for Middleware-based Database Replication," 25th IEEE Symposium on Reliable Distributed Systems, Oct. 1, 2006, 14 pages.

Third Chinese Office Action for Application No. 200980151932.3, mailed Dec. 3, 2013, 18 pages.

European Search Report for European Patent Application No. 09834198.5, mailed Dec. 10, 2013, 19 pages.

Decision to Grant for Japanese Patent Application No. 2011-541637, mailed Mar. 4, 2014, 6 pages.

Second Chinese Office Action for Application No. 200980151932.3, mailed Jun. 3, 2013, 8 pages.

First Office Action for Chinese patent application 200980151932.3 mailed Sep. 26, 2012, 27 pages.

* cited by examiner

SELECTIVE DATABASE REPLICATION

FIELD OF THE INVENTION

This invention generally relates to replicating databases, and in particular to selective replication of databases operating in a cluster.

BACKGROUND OF THE INVENTION

Computer applications use databases to store information. A database typically includes a sophisticated set of software functions, often referred to as a database management system (DBMS), that enable a user to define and create the database, update and query the database, and otherwise maintain the database. Databases offer security and ensure that updates are atomic, durable, and consistent, but often at the cost of complexity. It is not unusual for a business to employ full-time database specialists to maintain the business' databases. Application providers may desire to use a database to store critical data, such as configuration data, but do not want to require a customer to incur additional support costs associated with maintaining complex database software, or, in some cases, even be aware that an application is using a particular DBMS. Thus, application providers may desire the benefits of a DBMS, but desire to shield their customers from the complexity associated with a DBMS.

Certain applications are designed to operate cooperatively over a network in a distributed manner. For example, a telecommunications system may involve a number of data servers networked together in a cluster. Each server in the cluster communicates with other servers in the cluster. Each server may have an associated database in which information, such as configuration information, is maintained. Information maintained in the database may relate to an individual server, such as a hostname or Internet Protocol (IP) address, or may be common to each server on the network, such as whether the servers implement simple network management protocol (SNMP). It is not unusual in distributed systems for one server to be identified as a master or primary server, and the remaining servers to be designated as slave or secondary servers. Certain configuration changes made to the primary server may be required to be made to each of the secondary servers. Ideally, each time such a configuration change is made to a primary server, the appropriate configuration change will be made to the secondary servers without human involvement. While most modern DBMSs today have certain capabilities for propagating data among distributed databases, such as via database replication, implementing and maintaining replicated databases can require significant expertise. Moreover, replication increases the complexity of restoring a corrupted database or adding a new secondary database to a cluster, does not allow selective updating of secondary databases, and requires that each database be from the same DBMS vendor. Thus, there is a need for a mechanism for replicating database information among distributed databases that does not require significant database expertise from a customer, that is reliable and works in a multi-vendor environment, and that enables selective replication over a distributed network substantially simultaneously.

SUMMARY OF THE INVENTION

Those skilled in the art will appreciate the scope of the present invention and realize additional aspects thereof after reading the following detailed description of the preferred embodiments in association with the accompanying drawing figures.

The present invention relates to selectively replicating data, such as configuration data, from a primary database to one or more secondary databases. A replication task includes an update to a primary database associated with a primary server that needs to be replicated on one or more secondary databases associated with secondary servers. A secondary server determines that a primary table in the primary database has been modified with a first update command. The first update command can comprise one or more database modification statements. The secondary server determines a second update command that is based on the first update command. The secondary server generates a secondary federated table in the secondary server that is coupled to the primary table in the primary server. The secondary federated table allows data from the primary table to be accessed using conventional database commands, such as Structured Query Language (SQL) statements, on the secondary server. The secondary server applies the second update command to a secondary table using the secondary federated table, thus replicating the update from the primary database to the secondary database.

According to one embodiment of the invention, the primary server generates the second update command based on the first update command and stores the second update command in an update command table in the primary database. The primary server notifies the secondary server when the first update command has been applied to the primary table via a trigger, or alert. Upon receiving notification from the primary server, the secondary server accesses the update command table in the primary database and retrieves the second update command. The secondary server generates a secondary federated table that is coupled to the primary table, and updates a secondary table via the secondary federated table. The primary table, the secondary table, and the secondary federated table all have the same table definition.

According to another embodiment of the invention, each replication task has an associated unique task identifier and unique signature. The task identifier and signature associated with each replication task is stored in the primary database when the replication task is performed on the primary database, and the same unique task identifier and unique signature associated with the replication task is stored in the secondary database after the replication task has been performed on the secondary database. When the secondary server is notified that an update has occurred to a primary table in the primary database, the secondary server obtains the task identifiers and signatures associated with replication tasks from the primary database and compares the signatures to signatures previously stored in the secondary database. If a signature from the primary database does not match a signature from the secondary database, the secondary server performs the replication task on the secondary database and then stores the signature from the primary database in the secondary database so that the replication task will not be performed again.

According to another embodiment of the invention, the second update command conditions an update of the secondary table on criteria based on data in the secondary database. For example, an application installed on the primary server initiates a replication task that establishes a new configuration table in the primary database in which configuration data associated with the application is maintained. The secondary server is notified that a replication task has been performed on the primary database. The secondary server obtains the task identifier and signature associated with the replication task from the primary database and determines that the replication task has not been performed on the secondary database. The secondary server obtains the second update command based on the first update command used to create the new configuration table. However, the second update command conditions modification of a secondary configuration table in the secondary database on the existence of the secondary configuration table in the secondary database. Because the application has not yet been installed on the secondary server, the secondary configuration table does not yet exist on the secondary database, and no data is replicated from the new configuration table in the primary database to the secondary database. At a future point in time when the application is installed on the secondary server and a secondary configuration table is created in the secondary database, the secondary server can be directed to initiate the replication process. The secondary server will again obtain the task identifier and signature associated with the replication task from the primary database, determine that the signature from the primary database does not match a signature from the secondary database, and perform the replication task on the secondary database.

According to yet another embodiment of the invention, the second update command conditions an update of certain rows of the secondary table on criteria based on data in the secondary database. For example, an application on the primary server initiates a replication task that modifies certain rows in the primary table based on a particular criterion. The secondary server is notified that a replication task has been performed on the primary database. The secondary server obtains the task identifier and signature associated with the replication task from the primary database and determines that the replication task has not been performed on the secondary database. The secondary server obtains the second update command based on the first update command used to create the new configuration table. The secondary server performs the replication task and only certain rows in the secondary table are updated based on the particular criteria.

According to yet another embodiment of the invention, a new secondary server is added to a cluster of existing secondary servers. The new secondary server initiates and accesses the primary database to obtain the unique task identifiers and signatures associated with replication tasks on the primary server. Each replication task is then performed on the secondary database associated with the new secondary server. As such, a new secondary database is selectively replicated from the primary database without time-consuming manual configuration and without disruption to the primary database or any other secondary databases.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention enables a primary database associated with a primary server to be selectively replicated to a plurality of secondary databases associated with a plurality of secondary servers that operate in a cluster. The present invention uses conventional database modification statements to perform the replication and eliminates the complexity associated with conventional database replication while providing significantly more flexibility than conventional database replication. The present invention enables a plurality of clustered databases to be selectively replicated substantially simultaneously with one another with very little processing overhead or network bandwidth utilization. The present invention also enables automatic restoration of a database without human intervention or knowledge of complex database commands. Through the use of conventional database statements to perform replication tasks, the present invention provides selective database replication in a multi-vendor environment.

Figure 1:
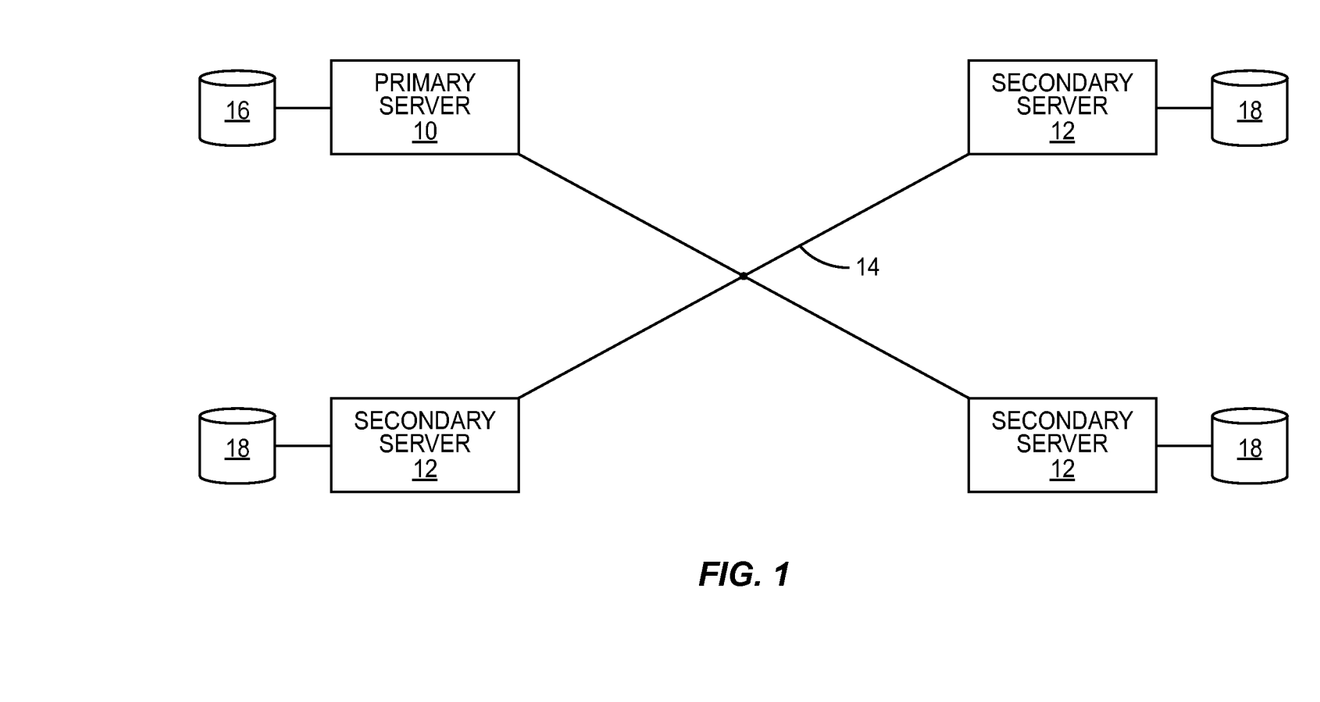
FIG. 1 is a block diagram of a system for selectively replicating databases according to one embodiment of the invention.

FIG. 1 is a block diagram of a system for selectively replicating databases according to one embodiment of the invention. A primary server 10 is coupled to a plurality of secondary servers 12 via a network 14. The primary server 10 and the secondary servers 12 preferably operate in a cluster and provide one or more services via the network 14 to other devices (not shown). The primary server 10 is communicatively coupled to and associated with a primary database 16 and each secondary server 12 is communicatively coupled to and associated with a secondary database 18. The primary server 10 and the secondary servers 12 may sometimes be referred to herein as nodes in the cluster. The designation of a particular node in the cluster as a primary or a secondary node may be installation dependent. However, the node designated as a primary server, such as the primary server 10, is the node with which all other nodes, such as the secondary servers 12, preferably communicate to receive certain information, such as configuration information common to each node in the cluster. Other than roles as primary or secondary servers, there may be little physical difference between the primary server 10 and the secondary servers 12. The primary server 10 and the secondary servers 12 may be collectively referred to herein as the servers 10,12 where the discussion relates to the primary server 10 and the secondary servers 12 equally.

The servers 10, 12 can comprise any data processing device suitable for implementing the functionality described herein. The servers 10, 12 may be general purpose computer servers running a conventional or proprietary operating system that implement a conventional or specialized functionality through one or more applications that execute on the servers 10, 12. Alternately, the servers 10, 12 may be special purpose devices that provide limited functionality. According to one embodiment of the invention, the servers 10, 12 comprise media application servers capable of providing a variety of communication services, such as the provision of voice, video, audio and other services, to a plurality of end-user devices (not shown), such as telephones, computers, and the like.

The network 14 can comprise any suitable communications technology, wired or wireless, capable of enabling communications between the servers 10, 12 and may use any conventional messaging protocols, such as Transmission Control Protocol/Internet Protocol (TCP/IP), Real-Time Transport Protocol (RTP), Media Resource Control Protocol (MRCP), and the like, or may use proprietary messaging protocols. The primary database 16 and the secondary databases 18 may comprise any suitable database management system (DBMS), such as a conventional relational or hierarchical DBMS. Notably, the primary database 16 and the secondary databases 18 may be provided by the same vendor or by different vendors, so long as the databases respond in the same manner to the same conventional database statements, such as Structured Query Language (SQL) statements. The primary database 16 and the secondary databases 18 may be referred to herein collectively as the databases 16, 18 where the discussion relates to both the primary database 16 and the secondary databases 18 equally.

While the databases 16, 18 are depicted as being associated with storage devices that are separate from the servers 10, 12, respectively, those skilled in the art will recognize that a DBMS includes not only data structures, such as tables, data sets and indexes for containing data, that may be stored on a storage device, but also a relatively complex set of database access algorithms that execute on the associated servers 10, 12, or on specialized database processors, and that enable application programs to create, update, access, and query the databases 16, 18. References to the primary database 16 as being 'on' or 'associated with' the primary server 10 refer to the association between the primary database 16 and the primary server 10, whether the primary database 16 is physically on, integrated with or merely accessible by the primary server 10 over the network 14, or another network or communications path. Similarly, references to a secondary database 18 as being 'on' or 'associated with' a respective secondary server 12 refer to the association between the secondary database 18 and the respective secondary server 12, whether the secondary database 18 is physically on, integrated with or merely accessible by the secondary server 12 over the network 14, or another network or communications path. References herein to obtaining database information from a server 10, 12 refer to obtaining information from the respective database 16, 18, as the case may be, that is associated with the respective server 10, 12, whether or not the respective server 10, 12 is actually involved in providing the data from the respective database 16, 18.

Applications that provide desired functionality of the servers 10, 12 may use the databases 16, 18 to store data for a variety of purposes, including information that relates to the operation of the respective applications. For example, the databases 16, 18 may include nodal data that relates solely to the particular server 10, 12 with which the database 16, 18 is associated, such as, for example, a hostname or an Internet Protocol (IP) address of the associated server 10, 12. The databases 16, 18 may also include cluster data that relates to all nodes in the cluster, such as whether the Simple Network Management Protocol (SNMP) is used to manage the servers 10, 12. Types of data that may be selectively replicated according to one embodiment of the invention may include, but are not limited to, Session Initiation Protocol (SIP) configuration information including SIP domains, SIP proxy attributes, SIP trusted nodes, operational measurement configuration information such as whether the operational measurement information is archived or not, media codec information identifying which codecs are enabled, priority ordering associated with codecs, engineering parameters such as maximum central processing unit limits, an address of a time synchronization server, license keys, and the like. According to the present invention, cluster data that is modified on the primary database 16 may be automatically replicated on the secondary databases 18 in a substantially simultaneous timeframe, for example within two or three seconds, while nodal data modified on the primary database 16 will not be replicated to the secondary databases 18.

Figure 2:
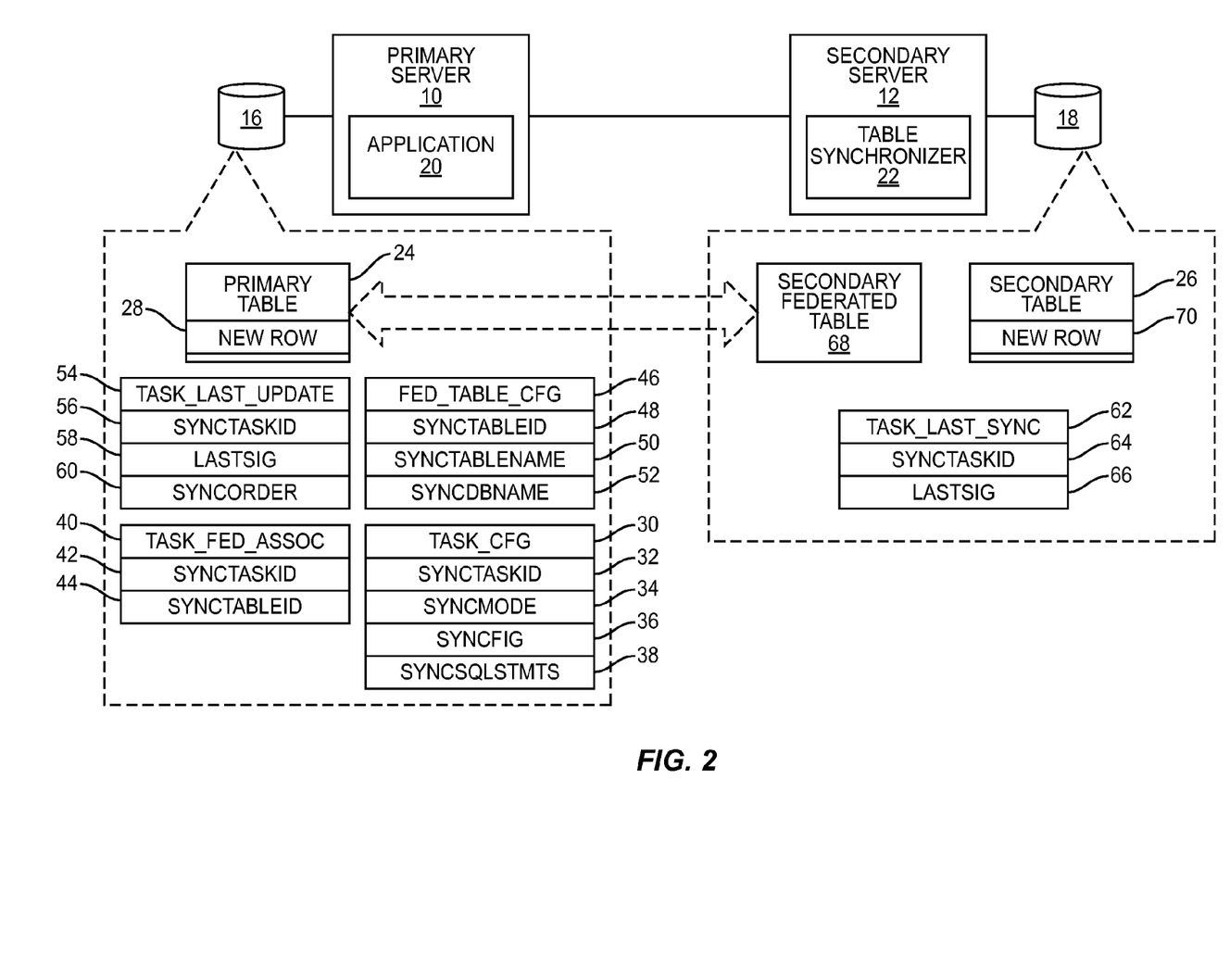
FIG. 2 is a block diagram showing aspects of the system illustrated in FIG. 1 in greater detail.
Figure 3:
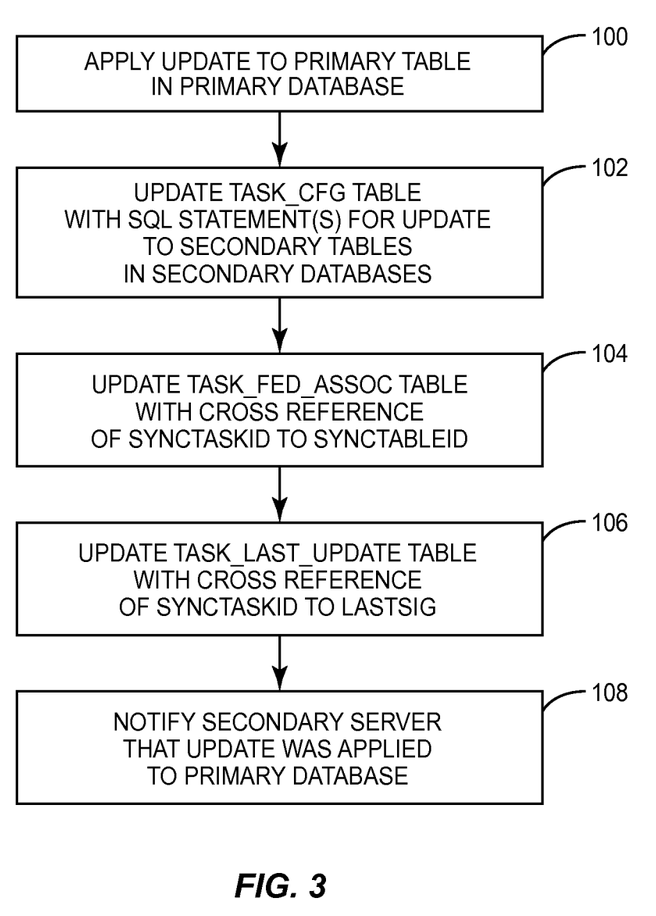
FIG. 3 is a flowchart illustrating a process for updating a primary table in a primary database according to one embodiment of the invention.
Figure 4:
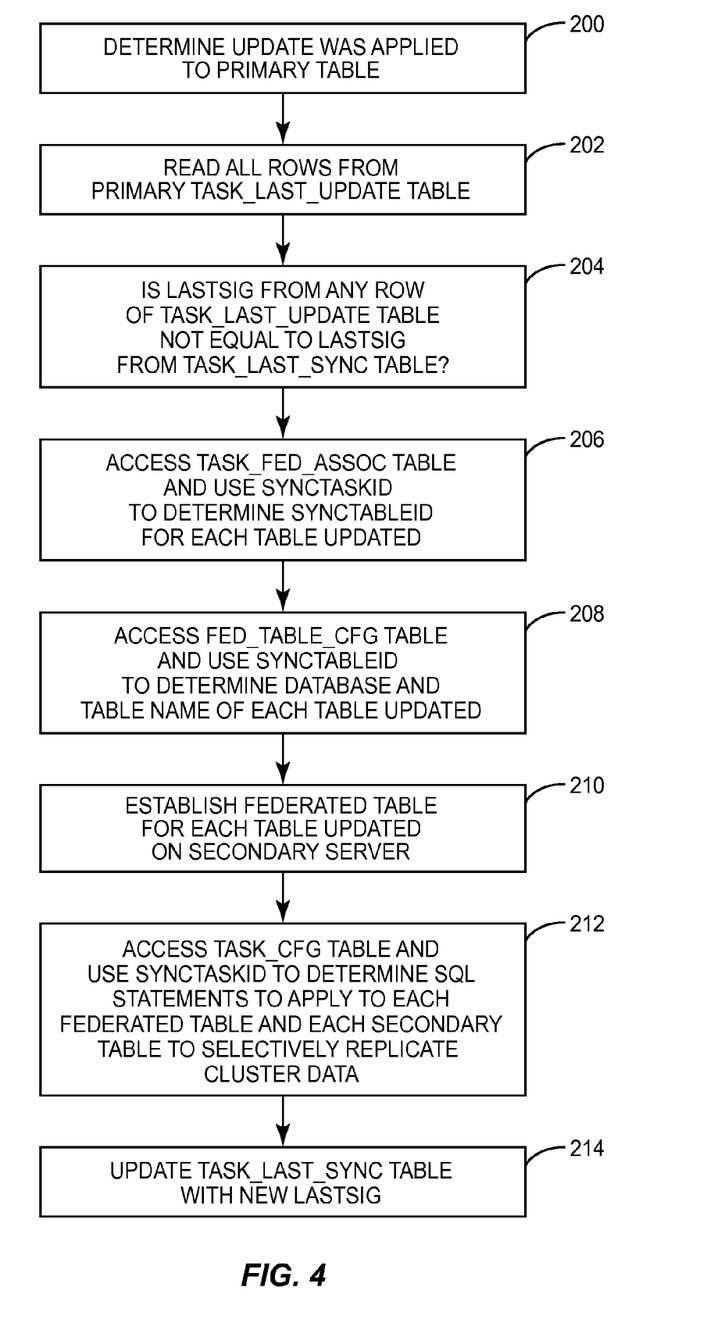
FIG. 4 is a flowchart illustrating a process for updating a secondary table in a secondary database according to the embodiment illustrated in FIG. 3.

FIG. 2 is a more detailed block diagram of the primary server 10 and the associated primary database 16 and a secondary server 12 and an associated secondary database 18 illustrated in FIG. 1, and includes table definitions that may be used to perform selective replication according to one embodiment of the invention. The primary server 10 includes an application 20 that provides a particular functionality of the primary server 10. The secondary server 12 includes a table synchronizer 22 which will be used herein to describe aspects of the present invention performed on one or more secondary servers 12 to selectively replicate data from the primary database 16 to the secondary database 18. FIG. 2 will be discussed in conjunction with FIG. 3, which is a flowchart illustrating a process for updating a primary table 24 in the primary database 16 according to one embodiment of the invention. FIG. 2 will also be discussed in conjunction with FIG. 4, which is a flowchart illustrating a process for replicating data from the primary table 24 to a secondary table 26 in the secondary database 18 according to one embodiment of the invention. FIGS. 2-4 will also be discussed in conjunction with FIG. 5, which is a block diagram illustrating table definitions of certain tables that may be used to perform selective database replication according to one embodiment of the present invention.

Referring now to FIGS. 2 and 3, assume that the application 20 modifies the primary table 24 by inserting a new row 28 of data containing one or more configuration parameters into the primary table 24 (step 100), and that this modification is a replication task that should be replicated to the secondary database 18. While the present invention will be described for purposes of illustration using a SQL DBMS and relational database terminology, such as tables, inserts, joins, and the like, those skilled in the art will recognize the concepts described herein are applicable to a multitude of different types of DBMSs, including hierarchical DBMSs, and the invention is not limited to the use of relational DBMSs. After inserting the new row 28 into the primary table 24, the application 20 inserts a new row of data associated with the update to the primary table 24 into a TASK_CFG table 30. The new row of data may include a SYNCTASKID field 32, which contains a unique task identifier that identifies the replication task. Those skilled in the art will recognize that unique identifiers may be obtained in a number of different ways, including invoking a vendor-provided operating system function or a DBMS function that provides unique identifiers upon request. The new row in the TASK_CFG table 30 may also include a SYNCMODE field 34, which contains information regarding the database statements that will be used to perform the replication on the secondary database 18. The SYNC- MODE field 34 can indicate that the replication task is performed with a single database statement or multiple database statements that can be obtained from a SYNCSQLSTMTS field 38, or that the secondary server 12 should generate multiple database statements to perform the replication task based on the schema definition of the primary table 24. The new row may also include a SYNCFIG field 36, which contains an indicator indicating whether or not the replication task should be replicated to the secondary table 26. The new row may also include the SYNCSQLSTMTS field 38, which may contain the actual database statements that are used by the secondary server 12 to perform the replication task on the secondary table 26 (step 102), based on the SYNCMODE field 34. Notably, and as described in greater detail herein, the database statements contained in the SYNCSQLSTMTS field 38 may not be the same database statements used by the application 20 to insert the new row 28 into the primary table 24, because the database statements in the SYNCSQLSTMTS field 38 will be those database statements that are executed on the secondary server 12 to replicate the data from the primary table 24 to the secondary table 26.

The application 20 next inserts a new row into a TASK_FED_ASSOC table 40. The new row in the TASK_FED_ASSOC table 40 may include a SYNCTASKID field 42, which contains the same SYNCTASKID as described above (step 104). The new row in the TASK_FED_ASSOC table 40 may also include a SYNCTABLEID field 44, which contains an identifier identifying the primary table 24. The SYNCTABLEID from the SYNCTABLEID field 44 may be used to cross reference a FED_TABLE_CFG table 46, which includes a row for each table in the primary database 16. Each row in the FED_TABLE_CFG table 46 may include a SYNCTABLEID field 48, which is a unique identifier associated with a particular table in the primary database 16, a SYNCTABLENAME field 50, which contains an actual table name in the primary database 16, and a SYNCDBNAME field 52, which contains the actual name of the primary database 16. The FED_TABLE_CFG table 46 is used to cross-reference a particular SYNCTABLEID with a particular primary table in the primary database 16.

The application 20 next inserts a new row into a TASK_LAST_UPDATE table 54. The new row in the TASK_LAST_UPDATE table 54 can include a SYNCTASKID field 56, which contains the SYNCTASKID described above with reference to the TASK_FED_ASSOC table 40 and the TASK_CFG table 30, and a LASTSIG field 58, which includes a unique signature that is associated with the respective SYNCTASKID (step 106). The new row may also include a SYNCORDER field 60, which includes data that can be used by the secondary servers 12 to ensure replication occurs in a particular order for efficiency or for data integrity purposes. While the TASK_CFG table 30, the TASK_FED_ASSOC table 40, the FED_TABLE_CFG table 46, and the TASK_LAST_UPDATE table 54 are all described herein as tables in the primary database 16, those skilled in the art will appreciate that such tables may be in a separate database from the primary database 16.

The application 20 next notifies the table synchronizer 22 executing on the secondary server 12 that a replication task was performed on the primary database 16 (step 108). The application 20 can notify the secondary server 12 of the replication task using any conventional mechanism that enables a task executing on a first server to notify a task executing on a second server of the occurrence of an event on the first server. According to one embodiment of the present invention, the application 20 notifies the table synchronizer 22 that the replication task was performed on the primary database 16 via an SQL trigger. The trigger may be fired upon inserting the new row into the TASK_LAST_UPDATE table 54. The trigger may cause an event upon which the table synchronizer 22 is waiting to occur, notifying the table synchronizer 22 that a replication task has been performed on the primary database 16.

Referring now to FIGS. 2 and 4, the table synchronizer 22 determines that an update was applied to the primary table 24 (step 200). The table synchronizer 22 obtains each row from the TASK_LAST_UPDATE table 54 in the primary database 16 (step 202). The table synchronizer 22 accesses a TASK_LAST_SYNC table 62 in the secondary database 18 that includes a row associated with each replication task that was previously performed on the secondary database 18. Each row in the TASK_LAST_SYNC table 62 includes a SYNCTASKID field 64, which contains a SYNCTASKID from the primary database 16 associated with a respective replication task, and a LASTSIG field 66, which includes the LASTSIG associated with the respective SYNCTASKID. The table synchronizer 22 compares the LASTSIG from each row of the TASK_LAST_UPDATE table 54 with the LASTSIG from each row of the TASK_LAST_SYNC table 62 to determine whether the LASTSIG for each row in the TASK_LAST_UPDATE table 54 matches a LASTSIG in a row of the TASK_LAST_SYNC table 62 (step 204). If the LASTSIG from a row of the TASK_LAST_SYNC table 62 does not match the LASTSIG of any row in the TASK_LAST_UPDATE table 54, then the replication task associated with that SYNCTASKID must be performed on the secondary database 18. Because the application 20 performed a new replication task that involved updating the primary table 24 with a new row 28, the LASTSIG from the new row in the TASK_LAST_UPDATE table 54 will not match the LASTSIG from any row in the TASK_LAST_SYNC table 62.

The table synchronizer 22 then accesses the TASK_FED_ASSOC table 40 in the primary database 16 and uses the SYNCTASKID from the new row in the TASK_LAST_UPDATE table 54 to access the TASK_FED_ASSOC table 40 to obtain the SYNCTABLEID for the respective SYNCTASKID (step 206). The table synchronizer 22 then accesses the FED_TABLE_CFG table 46 in the primary database 16 using the SYNCTABLEID from the TASK_FED_ASSOC table 40 to obtain the SYNCTABLENAME of the table and the SYNCDBNAME of the database that was used in the respective synchronization task (step 208). The table synchronizer 22 then establishes a secondary federated table 68 that refers to, or is coupled to, the particular primary table 24 identified by the SYNCTABLENAME field 50 in the FED_TABLE_CFG table 46 (step 210). As will be understood by those skilled in the art, a federated table enables a database table on a remote server to appear as if the database table is mounted, or otherwise exists, on a local server. While the phrase "federated table" is used in certain DBMSs, it will be appreciated that the capability and concept of a federated table exists in many different DBMSS, and the use of the phrase "federated table" herein encompasses the ability to represent a table on a local database from a remote database, such that database statements applied to the table in the local database cause data to be accessed from the remote database, irrespective of the specific terminology used to describe such a feature in any particular DBMS. The secondary federated table 68 of the present invention preferably has the same table definition of both the primary table 24 to which the secondary federated table 68 is coupled, and the secondary table 26.

The table synchronizer 22 accesses the TASK_CFG table 30 in the primary database 16 using the respective SYNCTASKID to obtain the update command from the SYNCSQLSTMTS field 38 of the respective row of the TASK_CFG table 30 (step 212). The database update command comprises one or more database statements associated with the respective DBMS. If the database update command comprises a single database statement, the SYNCMODE field 34 may have a value of "0." If the database update command comprises multiple database statements, the SYNCMODE field 34 may have a value of "1." The table synchronizer 22 then applies the database statements to the secondary table 26 using the secondary federated table 68 to create a new row 70 that replicates the data from the new row 28 in the primary table 24 in the primary database 16. The table synchronizer 22 then inserts a new row into the TASK_LAST_SYNC table 62 including the SYNCTASKID and the LASTSIG associated with the respective replication task obtained from the TASK_LAST_UPDATE table 54, SO that the table synchronizer 22 will not subsequently repeat the replication task (step 214). The table synchronizer 22, after a period of time, may then remove the secondary federated table 68.

In an alternate embodiment, the SYNCMODE field 34 has a value of "2," which is an indication to the table synchronizer 22 to generate the second command based on the table schema of the primary table 24. In such an embodiment, the table synchronizer 22 queries the schema of the primary database 16 to determine the table schema that defines the primary table 24 and the secondary table 26. The table synchronizer 22 generates insert, update, and delete SQL statements that perform a join on each field with the secondary federated table 68. The insert SQL statement adds new rows from the primary table 24 to the secondary table 26 that were not previously in the secondary table 26. The update SQL statement updates any rows in the secondary table 26 based on data in the same rows from the primary table 24. The delete SQL statement removes rows from the secondary table 26 that do not exist in the primary table 24.

Figure 5:
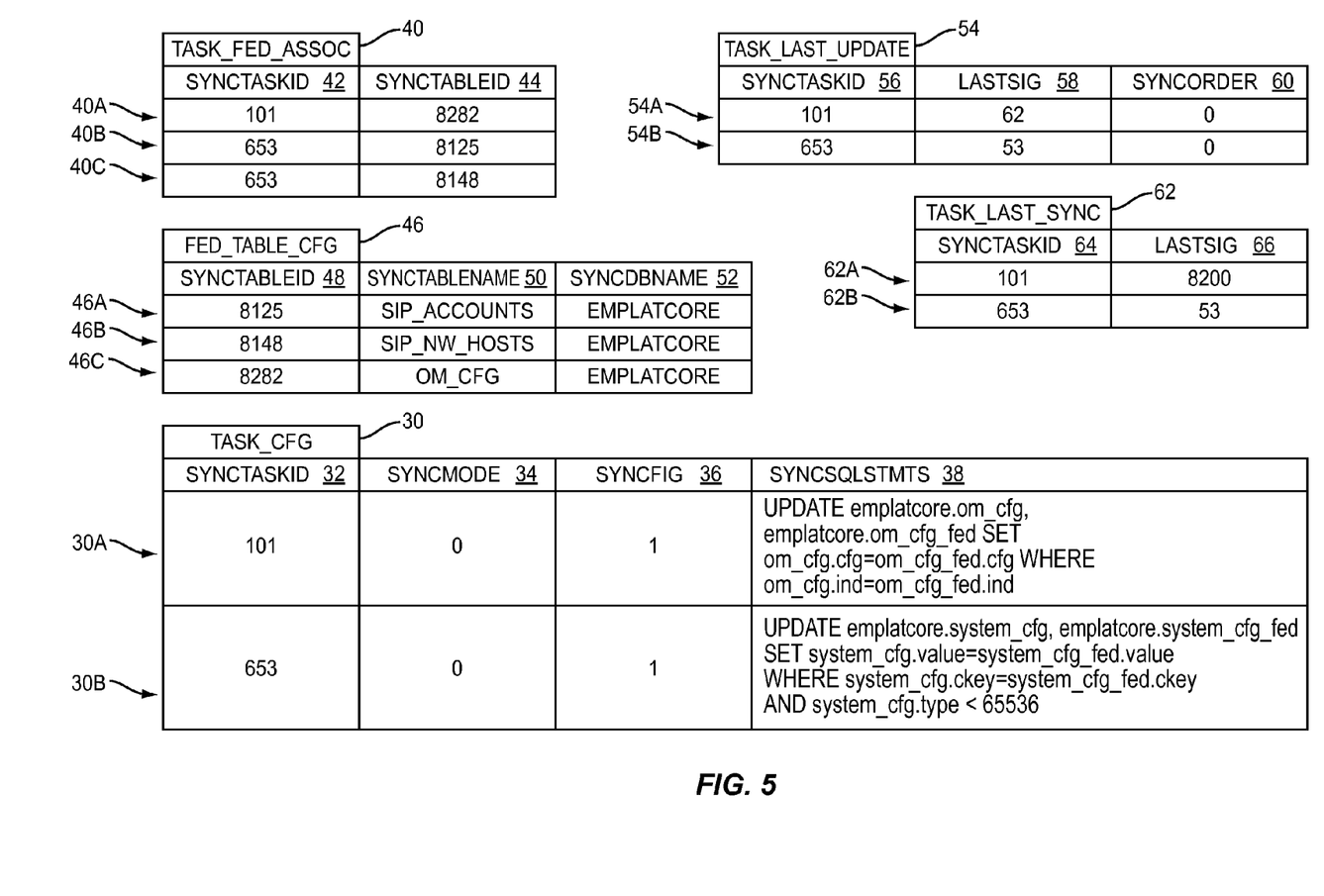
FIG. 5 is a block diagram illustrating exemplary data in a process for selective replication according to another embodiment of the invention.

FIG. 5 is a block diagram illustrating exemplary data of an exemplary replication task performed by the application 20 according to another embodiment of the present invention. The TASK_FED_ASSOC table 40, the TASK_CFG table 30, the FED_TABLE_CFG table 46, the TASK_LAST_UPDATE table 54, and the TASK_LAST_SYNC table 62 contain identical fields to those discussed with reference to FIG. 2. However, in FIG. 5, actual representative data is shown for purposes of illustration. Each row in a respective table will bear the same element reference numeral as the respective table followed by an alphabetical character. For example, the TASK_FED_ASSOC table 40 contains three rows 40A, 40B, and 40C. Each row in the TASK_FED_ASSOC table 40 includes the SYNCTASKID field 42 containing a particular value and the SYNCTABLEID field 44 containing a particular value, as discussed herein. The data within a field will be referred to herein by the name of the respective field. Assume that the application 20 has just finished a replication task having a SYNCTASKID equal to "101." The application 20 stored the row 30A in the TASK_CFG table 30, wherein the SYNCTASKID is equal to "101," the SYNCMODE is equal to "0," the SYNCFIG is equal to "1," and the SYNCSQLSTMTS contains an SQL statement that the table synchronizer 22 should apply to the secondary table 26 to perform the replication task. The application 20 has also inserted a row 40A in the TASK_FED_ASSOC table 40 containing the same SYNCTASKID and referencing a primary table having a SYNCTABLEID equal to "8282." The application 20 has inserted a row 54A into the TASK_LAST_UPDATE table 54 containing the same SYNCTASKID, and a LASTSIG equal to "62." The row 54A contains a SYNCORDER equal to "0," which indicates that the order of this replication task is unrelated to the order of other replication tasks. Assume that the application 20 notifies the table synchronizer 22 at the completion of the replication task. The table synchronizer 22 reads rows 54A and 54B from the TASK_LAST_UPDATE table 54 in the primary database 16. The table synchronizer 22 compares the LASTSIG from each of the rows 54A and 54B with the LASTSIG from rows 62A and 62B of the TASK_LAST_SYNC table 62 in the secondary database 18. The table synchronizer 22 determines that the LASTSIG of the row 62A does not match the LASTSIG of the row 54A. The table synchronizer 22, using the SYNCTASKID value of "101," reads the TASK_FED_ASSOC table 40 and obtains the row 40A, which contains an identical SYNCTASKID value of "101." The table synchronizer 22 determines that the SYNCTABLEID of the row 40A is equal to "8282." The table synchronizer 22 obtains the row 46C from the FED_TABLE_CFG table 46 using the SYNCTABLEID from the row 46C. The row 46C indicates that the table name contained in the SYNCTABLENAME field 50 is "OM_CFG," and the database name in the SYNCDBNAME field 52 is equal to "EMPLATCORE." The table synchronizer 22 generates the secondary federated table 68 named "OM_CFG_FED" on the secondary database 18. Note that the table synchronizer 22 generated a federated database table based on the name of the primary table 24 that was updated in the replication task, suffixed with the suffix "_FED." Any suitable naming convention can be used to generate the secondary federated table 68, so long as the primary server 10 uses the same naming convention for the update command stored in the SYNCSQLSTMTS field 38 of the TASK_CFG table 30 that is applied to the secondary database 18 to accomplish the respective replication task.

The secondary federated table 68 is coupled to the primary table 24 in the primary database 16. The secondary federated table 68 essentially provides a virtualized view from the secondary database 18 of the primary table 24 on the primary server 10 in that SQL statements applied to the secondary database 18 that refer to the secondary federated table 68 will access the primary table 24 by virtue of the federated coupling between the secondary federated table 68 and the primary table 24, without copying the entire primary table 24 to the secondary database 18. The table synchronizer 22 accesses the TASK_CFG table 30 and, using the SYNCTASKID value equal to "101," obtains row 30A from the TASK_CFG table 30. The value of "0" in the SYNCMODE field 34 indicates that the update command is a single database statement. The value of "1" in the SYNCFIG field 36 indicates that this task should be replicated on the secondary server 12. The table synchronizer 22 obtains the specific database statement from the SYNCSQLSTMTS field 38, which, as shown in FIG. 5, is a "UPDATE" SQL statement, wherein a "CFG" field in the "OM_CFG" secondary table 26 will be set to the value of a "CFG" field from the primary table 24 wherever an "IND" field of the OM_CFG secondary table 26 is equal to a "IND" field of the primary table 24. Note that the "UPDATE" statement contained in the SYNCSQLSTMTS field 38 refers to the secondary federated table 68. The use of the secondary federated table 68 enables conventional SQL statements to be used to perform the replication task on the secondary server 12. Note also that each of the tables illustrated in FIG. 5 reflect that a second replication task bearing a SYNCTASKID value equal to "653" was previously performed on both the primary database 16 and the secondary database 18, and that such replication task involved multiple primary tables 24 and multiple SQL statements.

Figure 6:
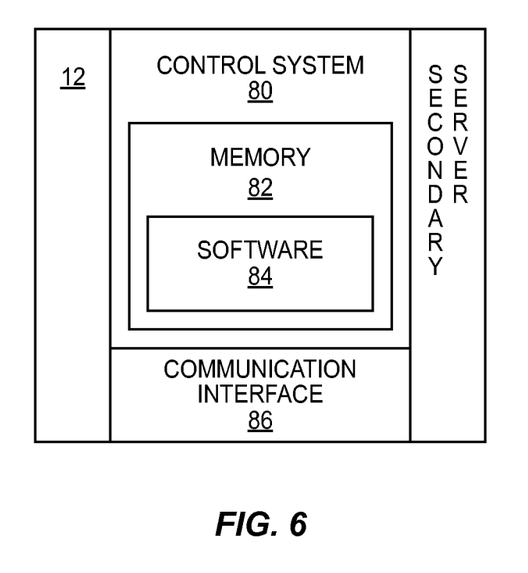
FIG. 6 is a block diagram of a server according to one embodiment of the invention.

FIG. 6 is a block diagram of a secondary server 12 according to one embodiment of the present invention. The secondary server 12 includes a control system 80 containing a memory 82 in which software 84 is stored suitable for carrying out the functionality of the table synchronizer 22 as described herein. The secondary server 12 includes a communication interface 86 for interfacing with the network 14 or the secondary database 18, as appropriate. While not shown herein, a block diagram of the primary server 10 may be similar to the block diagram of the secondary server 12, wherein the associated software in the memory would be suitable for carrying out the functionality described with respect to the application 20.

Those skilled in the art will recognize improvements and modifications to the preferred embodiments of the present invention. All such improvements and modifications are considered within the scope of the concepts disclosed herein and the claims that follow.

What is claimed is:

1. A method for replicating data from a first database to a second database comprising:
    determining that a first update command has modified data in a primary table in a primary database associated with a primary server;
    in response to determining that the first update command has modified data in the primary table in the primary database, determining a second update command based on the first update command; and
    applying the second update command to replicate the data in a secondary table in a secondary database associated with a secondary server using a secondary federated table coupled to the primary table,
    wherein applying the second update command to replicate the secondary table further comprising generating the secondary federated table, applying the second update command to modify the secondary table using the secondary federated table, and removing the secondary federated table after applying the second update command.

* * * * *